US011326026B2

(12) United States Patent
Resetco

(10) Patent No.: US 11,326,026 B2
(45) Date of Patent: May 10, 2022

(54) REMOVABLE SILICONE FILMS AND RELATED METHODS

(71) Applicant: Xerox Corporation, Norwalk, CT (US)

(72) Inventor: Christina Resetco, Toronto (CA)

(73) Assignee: Xerox Corporation, Norwalk, CT (US)

( * ) Notice: Subject to any disclaimer, the term of this patent is extended or adjusted under 35 U.S.C. 154(b) by 150 days.

(21) Appl. No.: 16/378,670

(22) Filed: Apr. 9, 2019

(65) Prior Publication Data

US 2020/0325278 A1    Oct. 15, 2020

(51) Int. Cl.
| | |
|---|---|
| *C08L 83/08* | (2006.01) |
| *C08G 77/388* | (2006.01) |
| *C08K 3/22* | (2006.01) |
| *C08K 3/36* | (2006.01) |
| *C08K 5/1539* | (2006.01) |

(52) U.S. Cl.
CPC .............. *C08G 77/388* (2013.01); *C08K 3/22* (2013.01); *C08K 3/36* (2013.01); *C08K 5/1539* (2013.01); *C08L 83/08* (2013.01); *C08K 2003/2227* (2013.01); *C08K 2003/2241* (2013.01); *C08K 2003/2296* (2013.01); *C08K 2201/003* (2013.01); *C08L 2203/16* (2013.01); *C08L 2312/00* (2013.01)

(58) Field of Classification Search
CPC . C08G 77/388; C08K 2201/011; C08L 83/08; C08L 83/04
See application file for complete search history.

(56) References Cited

U.S. PATENT DOCUMENTS

| | | | | |
|---|---|---|---|---|
| 4,384,130 | A * | 5/1983 | Martin | C08G 77/42 556/418 |
| 4,496,687 | A | 1/1985 | Okada et al. | |
| 5,302,659 | A * | 4/1994 | Bindl | C08G 77/388 524/838 |
| 5,464,470 | A | 11/1995 | Brachman et al. | |
| 6,124,490 | A * | 9/2000 | Gormley | A61K 8/0208 106/287.11 |
| 6,288,170 | B1 | 9/2001 | Waid | |
| 6,576,606 | B2 * | 6/2003 | Richards, III | C11D 3/0015 510/327 |
| 7,531,595 | B2 | 5/2009 | Lewandowski et al. | |
| 8,569,208 | B1 | 10/2013 | Ribi | |
| 8,574,719 | B2 * | 11/2013 | Davies | C09D 5/1637 428/447 |
| 8,653,190 | B2 | 2/2014 | Chatterjee et al. | |
| 10,756,241 | B2 * | 8/2020 | Lub | C08K 11/00 |
| 2008/0124409 | A1 * | 5/2008 | Zimmerman | A61P 39/06 424/745 |
| 2015/0313815 | A1 * | 11/2015 | Khoshdel | A61Q 17/04 424/59 |
| 2017/0096533 | A1 * | 4/2017 | Feng | C08K 5/1539 |
| 2017/0096534 | A1 * | 4/2017 | Feng | C08L 83/08 |
| 2017/0222097 | A1 * | 8/2017 | Lub | C08K 11/00 |
| 2017/0355824 | A9 * | 12/2017 | Feng | C08G 77/26 |
| 2018/0066113 | A9 * | 3/2018 | Feng | A61K 8/898 |

FOREIGN PATENT DOCUMENTS

| | | |
|---|---|---|
| EP | 0688351 | 8/1997 |
| WO | WO1991006424 A | 5/1991 |

OTHER PUBLICATIONS

Lai et al., "A rigid and healable polymer cross-linked by weak but abundant Zn(II)-carboxylate interactions," Nature Communications, (2018)9:2725, pp. 1-9.

* cited by examiner

*Primary Examiner* — Margaret G Moore
(74) *Attorney, Agent, or Firm* — Bell & Manning, LLC; N. Meredith Porembski

(57) ABSTRACT

Reversibly crosslinkable compositions are provided for forming removable crosslinked films. A reversibly crosslinkable composition may comprise entangled chains of a polysiloxane comprising pendant functional groups having formula —NH—(C=O)—X—COOH, wherein X is an alkyl group, an alkenyl group, or an aryl group; a plurality of inorganic oxide nanoparticles; and a solvent; wherein non-covalent bonds between the pendant functional groups and the inorganic oxide nanoparticles crosslink the entangled chains to form a polymeric matrix in the absence of the solvent, wherein the non-covalent bonds dissociate and the polymeric matrix collapses in the presence of water and heat.

18 Claims, No Drawings

REMOVABLE SILICONE FILMS AND RELATED METHODS

BACKGROUND

Recycling of plastics is imperative to address the problem of widespread pollution due to the vast amount of plastic waste being used. However, a challenge with recycling includes removal of inks and adhesives used on plastic packaging. A significant amount of plastic packaging cannot be recycled if such inks and adhesives cannot be adequately removed. Typical methods for removal such inks and adhesives involve the use of toxic chemicals and high temperatures, posing additional health, environmental and cost concerns. Some removable polymer adhesives have been developed. However, these adhesives still generally require chemicals and/or high temperatures to achieve removal, which is unsuitable for certain substrate materials, especially plastics. Other removable materials rely on release liners positioned directly underneath the removable materials. These materials and release liners often make use of expensive chemical components.

SUMMARY

Provided are reversibly crosslinkable compositions and removable crosslinked films formed from the compositions. Also provided are methods of making and using the reversibly crosslinkable compositions.

In one aspect, reversibly crosslinkable compositions are provided. In embodiments, such a composition comprises entangled chains of a polysiloxane comprising pendant functional groups having formula —NH—(C=O)—X—COOH, wherein X is an alkyl group, an alkenyl group, or an aryl group; a plurality of inorganic oxide nanoparticles; and a solvent; wherein non-covalent bonds between the pendant functional groups and the inorganic oxide nanoparticles crosslink the entangled chains to form a polymeric matrix in the absence of the solvent, wherein the non-covalent bonds dissociate and the polymeric matrix collapses in the presence of water and heat.

In another aspect, removable crosslinked films are provided. In embodiments, such a film comprises a substrate and a polymeric matrix on a surface of the substrate, the polymeric matrix comprising entangled chains of a polysiloxane comprising pendant functional groups having formula —NH—(C=O)—X—COO$^-$, wherein X is an alkyl group, an alkenyl group, or an aryl group and inorganic oxide nanoparticles, wherein non-covalent bonds between the pendant functional groups and the inorganic oxide nanoparticles crosslink the entangled chains, wherein the non-covalent bonds dissociate and the polymeric matrix collapses in the presence of water and heat.

Methods of making and using the reversibly crosslinkable compositions are also provided.

DETAILED DESCRIPTION

Provided are reversibly crosslinkable compositions and removable crosslinked films formed from the compositions. Also provided are methods of making and using the reversibly crosslinkable compositions. The reversibly crosslinkable compositions comprise only a few components and are based on certain polysiloxanes which form rigid non-covalently crosslinked polymeric matrices with inorganic oxide nanoparticles. The non-covalently crosslinked polymeric matrices can be collapsed using mild conditions, including water and relatively low temperatures, e.g., 50° C. This allows the non-covalently crosslinked polymeric matrices to be removed from an underlying substrate on which they have been formed. Conventional silicone compositions are typically multicomponent systems which form effectively permanent covalently crosslinked networks which can only be released/removed using relatively harsh solvents and high temperatures.

In one aspect, reversibly crosslinkable compositions are provided. In embodiments, such a composition comprises a polysiloxane comprising pendant functional groups having a formula —NH—(C=O)—X—COOH and a plurality of inorganic oxide nanoparticles. The symbol "—" denotes the covalent bond to the backbone of the polysiloxane. X may vary, but in embodiments, X is an alkyl group, an alkenyl group, or an aryl group. These groups and illustrative species are further described below. The term "pendant" indicates that a single covalent linkage (in this case the —NH—(C=O)— amide linkage) connects the functional group to the polysiloxane backbone. The polysiloxane backbone is the main contributor to the mechanical properties of removable crosslinked films formed from the reversibly crosslinkable compositions. The pendant functional group is the main contributor to the formation of reversible crosslinks which form between entangled chains (or portions thereof) of the polysiloxane. Specifically, non-covalent bonding between the pendant functional groups and the inorganic oxide nanoparticles crosslinks entangled chains (or portions thereof) to form a polymeric matrix.

The non-covalent bonding includes, but it not limited to, ionic bonding between the carboxylate form of the pendant functional group and the inorganic oxide nanoparticle. Hydrogen bonding and dipole-dipole interactions are other types of non-covalent associations between the pendant functional groups and the inorganic oxide nanoparticles. In addition, non-covalent bonding between different pendant functional groups of entangled chains (or portions thereof) can also provide crosslinks. This type of non-covalent bonding depends, in part, upon the choice of X in the pendant functional group. By way of illustration, when X comprises an aryl group, e.g., benzene, π-π stacking may occur between different pendant functional groups. Regardless of the type of non-covalent bonding, the non-covalent bonds and the resulting crosslinks are those which dissociate in the presence of heat and water. Under these conditions, the polymeric matrix formed via the crosslinks collapses, releasing individual polysiloxane chains.

The polysiloxane comprising the pendant functional groups may be a polysiloxane derived from the reaction of an amino-functionalized polysiloxane with a cyclic anhydride. The amino-functionalized polysiloxane may be a copolymer comprising [OSiR$_2$] monomeric units wherein R is an unsubstituted alkyl or an unsubstituted phenyl and [OSiR'$_2$] monomeric units wherein R' is an alkyl/phenyl substituted with a primary amine (—NH$_2$) group. The amount of the primary amine-containing monomeric unit may be selected to provide a desired amount of the pendant functional groups in the polysiloxane. The desired amount depends upon the number of non-covalent bonding interactions desired, and thus, the desired strength of the crosslinking. The strength of the crosslinking determines the mechanical properties of the crosslinked composition, where more crosslinks provide materials with a greater modulus of elasticity. The amount of the primary amine-containing monomeric unit may be given as a mole %. In embodiments, the amount is in a range of from 2% to 30%, from 2% to 15%, and from 2% to 10%. Illustrative amino-functionalized polysiloxanes include 20% aminoethylaminopropyl-methylsiloxanedimethylsiloxane copolymer; 6-7% aminopropylmethylsiloxane-dimethylsiloxane copolymer; 4-5% aminopropylmethylsiloxane-(dimethylsiloxane) copolymer; 18-24% aminoethylaminopropylmethylsiloxane-dimethylsiloxane copolymer. Such amino-functionalized polysiloxanes are commercially available from Gelest Inc.

The amino-functionalized polysiloxane may be characterized by its weight average molecular weight ($M_w$). In embodiments, the $M_w$ of the amino-functionalized polysiloxane is in a range of from 3,000 to 200,000. This includes embodiments in which the $M_w$ is in a range of from 5,000 to 100,000 or from 10,000 to 75,000.

As noted above, the amino-functionalized polysiloxane may be reacted with a cyclic anhydride to provide the crosslinkable polysiloxane comprising the pendant functional groups. The cyclic anhydride may be a small molecule compound. This is by contrast to an oligomer or a polymer comprising a cyclic anhydride. Illustrative small molecule cyclic anhydrides include maleic anhydride, succinic anhydride, itaconic anhydride, phthalic anhydride, glutaric anhydride, and (2-dodecen-1-yl)succinic anhydride. These cyclic anhydrides may be mixed with any of the amino-functionalized polysiloxanes described above at a temperature (e.g., in a range of from 30° C. to 60° C.) and for a time (e.g., in a range of from 2 hrs to 24 hrs). These conditions result in ring-opening reactions of the cyclic anhydride molecules by the primary amine groups of the amino-functionalized polysiloxane to form amide bonds and the resulting —NH—(C=O)—X—COOH pendant functional groups. Thus, the identity of X depends upon the choice of the cyclic anhydride. However, as noted above, X may be an alkyl group, an alkenyl group, or an aryl group.

By way of illustration, maleic anhydride reacts with a primary amine group of an amino-functionalized polysiloxane to provide a pendant functional group having the formula —NH—(C=O)—(CH=CH)—COOH, i.e., X is an ethylene group. Table 1 below lists several cyclic anhydrides and the pendant functional group resulting from the reaction with the primary amine group of an amino-functionalized polysiloxane.

with the carboxylate form of the pendant functional group. Illustrative inorganic oxides include zinc oxide, silicon dioxide, titanium dioxide, and aluminum oxide. The dimensions and shape of the inorganic oxide nanoparticles are not particularly limited. These parameters may be selected, at least in part, to tune the number of non-covalent bonding interactions (e.g., nanoparticles having a greater surface area can allow for more non-covalent bonding with pendant functional groups). As noted above, this affects the strength of the crosslinking and the mechanical properties of the removable crosslinked film. However, in embodiments, each of the dimensions of the inorganic oxide nanoparticles is less than 1000 nm and the shape is spherical. In embodiments, the inorganic oxide nanoparticles are spherical having a diameter in a range of from 10 nm to 500 nm, from 10 nm to 250 nm, or from 20 nm to 100 nm. The diameter may be an average diameter as determined from a representative number of inorganic oxide nanoparticles. Commercially available inorganic oxide nanoparticles may be used.

The reversibly crosslinkable compositions may comprise various relative amounts of the polysiloxane comprising the pendant functional groups and the inorganic oxide nanoparticles. Again, the relative amounts may be selected based upon the desired number of non-covalent bonding interactions, the strength of the crosslinking, and the mechanical properties of the crosslinked composition. However, in embodiments, the reversibly crosslinkable composition has an amount of the inorganic oxide nanoparticles in a range of from 10 weight (wt) % to 50 wt %. This weight percentage refers to the (weight of the inorganic oxide nanoparticles)/(total weight of the inorganic oxide nanoparticles and the polysiloxane comprising the pendant functional groups) *100. In embodiments, the amount of inorganic oxide nanoparticles is in a range of from 10 wt % to 50 wt %, from 20 wt % to 40 wt %, or from 15 to 30 wt %.

The reversibly crosslinkable compositions may comprise additional components. In embodiments, the compositions comprise a solvent, e.g., an organic solvent or mixture of organic solvents. Illustrative organic solvents include tetrahydrofuran, diethyl ether, toluene, hexane, heptane; alcohols such as methanol, ethanol, propanol; and glycols such as

TABLE 1

Cyclic Anhydrides and Corresponding Pendant Functional Groups

| Cyclic Anhydride | Pendant Functional Group | X |
|---|---|---|
| succinic anhydride | —NH—(C=O)—(CH$_2$CH$_2$)—COOH | ethyl group |
| itaconic anhydride | —NH—(C=O)—(CH$_2$C=CH$_2$)—COOH | allyl group |
| phthalic anhydride | —NH—(C=O)—(C$_6$H$_4$)—COOH | phenyl group |
| glutaric anhydride | —NH—(C=O)—(CH$_2$CH$_2$CH$_2$)—COOH | propyl group |
| (2-dodecen-1-yl) succinic anhydride | —NH—(C=O)—(CH$_2$CHCH$_2$CH=CH(CH$_2$)$_8$CH$_3$)—COOH | tetradec-4-enyl group |

The desired polysiloxane comprising the pendant functional groups may be characterized by the amount of the pendant functional groups. This is controlled by the amount of the primary amine-containing monomeric unit in the amino-functionalized polysiloxane, the relative amounts of the amino-functionalized polysiloxane and the cyclic anhydride, and the reaction efficiency. However, in embodiments, the amount (referenced as a mole % of the pendant functional group) is in a range of from 2% to 30%, from 2% to 15%, or from 2% to 10%.

As noted above, the reversibly crosslinkable compositions also comprise inorganic oxide nanoparticles. The inorganic oxide particles are those capable of non-covalent bonding diethylene glycol, ethylene glycol dimethyl ether. Additives may be included in the compositions such as surfactants, wetting agents, adhesion promoters, pH adjusters, and stabilizers.

However, in embodiments, the reversibly crosslinkable compositions are characterized by the absence of certain components. In embodiments, the pendant functional groups are the only functional groups of the polysiloxane backbone. That is, the polysiloxane comprising the pendant functional groups is free of any other functional groups. This includes embodiments in which the polysiloxane comprising the pendant functional groups is free of amine groups. In embodiments, the polysiloxane comprising the pendant functional groups is the only polymeric component in the reversibly crosslinkable composition. That is, the reversibly crosslinkable composition is free of any other polymeric (or oligomeric) component, such as a cyclic anhydride polymer. In embodiments, the reversibly crosslinkable composition is free of a chemical curing agent, i.e., a compound capable of inducing reactions between components of the reversibly crosslinkable composition to achieve covalent crosslinks. In embodiments, the reversibly crosslinkable composition is free of an organosilane compound, i.e., a small molecule compound containing a single silicon atom. In embodiments, the reversibly crosslinkable composition consists essentially of, or consists of, the polysiloxane comprising the pendant functional groups, the inorganic oxide nanoparticles, a solvent, and optionally, one or more additives selected from surfactants, wetting agents, adhesion promoters, pH adjusters, and stabilizers.

In another aspect, methods of making the reversibly crosslinkable compositions are provided. In embodiments, such a method comprises mixing the polysiloxane comprising the pendant functional groups with the inorganic oxide nanoparticles at a temperature (e.g., room temperature) and for a period of time (e.g., 30 minutes to 24 hrs). Each component may be provided as a solution or as a dispersion in any of the solvents described above, in an appropriate amount to provide any of the relative polysiloxane/inorganic nanoparticle amounts described above.

In another aspect, methods of using the reversibly crosslinkable compositions are provided. In embodiments, such a method comprises depositing the reversibly crosslinkable composition onto a surface of a substrate and removing solvent from the reversibly crosslinkable composition to form a crosslinked film. A variety of substrates may be used, including plastic, glass, and metal substrates. The deposition step may be accomplished via any number of thin-film deposition techniques. Removing the solvent may be accomplished by exposing the as-deposited reversibly crosslinkable composition to an elevated temperature (e.g., a temperature in a range from 50° C. to 90° C.) for a period of time. However, evaporation under ambient conditions may be used. Solvent removal facilitates the non-covalent association of the pending functional groups of the polysiloxane with the inorganic oxide nanoparticles, thereby non-covalently crosslinking entangled chains (or portions thereof chains) of the polysiloxane to form the polymeric matrix. This polymeric matrix may be referred to as the crosslinked film. The crosslinked film is generally a thin film. The thickness of the removable crosslinked film may be in a range of from 1 μm to 10 μm. This may be an average thickness as determined from a representative number of cross-sections of the film.

Due to the crosslinking, the crosslinked film is inherently more rigid than the as-deposited reversibly crosslinkable composition. The crosslinked film may be characterized by its mechanical properties, which are tunable as described above. For example, the elastic modulus of the crosslinked film may be in the range of from 0.1 to 1 MPa and the hardness Shore A may be in the range of from 20 to 80. The crosslinked films may also be characterized by a rub resistance as further described below.

The crosslinked film may also be described as being non-tacky, corresponding to a tack of 1 or 0 using the method described in the Examples, below.

The composition of the crosslinked film may also be characterized with reference to descriptions of the components of the reversibly crosslinkable compositions as described above. For example, in embodiments in which the reversibly crosslinkable composition is characterized as being free of a chemical curing agent, the crosslinked film may also be characterized as being free of such an agent as well as free of catalysts or initiators that are typically used in conjunction with chemical curing agents (or the reaction product of such an agent). The crosslinked film may be described as being free of covalent crosslinks, i.e., free of covalent bonding between entangled chains (or portions thereof chains) of the polysiloxane.

Since the non-covalent associations and the crosslinking in the crosslinked film are reversible, the crosslinked film may be removed from the substrate surface on which it was formed. As such, the crosslinked film may also be referred to as a removable crosslinked film (or a reversibly crosslinked film). By contrast to conventional silicone films, the removal may be accomplished using mild conditions, e.g., water (including pure water) and low temperatures. In embodiments, the temperature is no more than 60° C., no more than 50° C., or in the range of from 30° C. to 60° C. Under these conditions, the non-covalent bonding and crosslinks dissociate and the polymeric matrix collapses, releasing individual polysiloxane chains. The collapsed polymeric matrix can also be recovered and reconstituted as any of the reversibly crosslinkable compositions described above.

The removable crosslinked film may be characterized by its resistance to removal under certain conditions, i.e., its "rub resistance." Rub resistance may be measured as described in the Example, below. In embodiments, the removable crosslinked film has a rub resistance of greater than 10, 20, 30, or 40 at room temperature and when exposed to water or tetrahydrofuran. These rub resistances may indicate that the conditions are insufficient to reverse the non-covalent bonding/crosslinking and remove the film. In embodiments, the removable crosslinked film has a rub resistance of less than 10, 7, or 5 at 50° C. and when exposed to water. These rub resistances may indicate that the conditions are sufficient to reverse the non-covalent bonding/crosslinking and remove the film.

In this disclosure, unless otherwise indicated, the following definitions apply. Alkyl group means a linear, branched or cyclic alkyl group in which the number of carbons may range from, e.g., 2 to 12, 2 to 6, or 2 to 4. The alkyl group may be unsubstituted, by which it is meant the alkyl group contains no heteroatoms. The alkyl group may be substituted, by which it is meant an unsubstituted alkyl group in which one or more bonds to a carbon(s) or hydrogen(s) are replaced by a bond to non-hydrogen and non-carbon atoms.

Alkenyl group means a mono- or polyunsaturated, linear, branched or cyclic alkenyl group in which the number of carbons may range from, e.g., e.g., 2 to 12, 2 to 6, or 2 to 4. The alkenyl group may be unsubstituted or substituted as described above with respect to alkyl groups.

An aryl group may be monocyclic having one aromatic ring or polycyclic having fused aromatic rings (e.g., two, three, etc. rings). Monocyclic aryl groups may be unsubstituted or substituted as described above with respect to alkyl groups. However, substituted monocyclic aryl groups also refer to an unsubstituted monocyclic aryl group in which one or more carbon atoms are bonded to an unsubstituted or substituted alkane, an unsubstituted or substituted alkene, or an unsubstituted or substituted monocyclic aryl group or a polycyclic aryl group. The meaning of unsubstituted and substituted alkanes and unsubstituted and substituted alkenes follows the meaning described above for unsubstituted and substituted alkyl and alkenyl groups, respectively. Polycyclic aryl groups are unsubstituted.

EXAMPLES

Example 1. Silicone Polymer Functionalized with Phthalic Anhydride and Zinc Oxide Nanoparticles To prepare functionalized silicone polymer with an aromatic moiety, 2 g of (6-7% aminopropylmethylsiloxane)-dimethylsiloxane copolymer, $M_w$~50,000 Da was dissolved in 3 g of tetrahydrofuran at 50° C. at a stirring rate of 1000 RPM. Next, 50 mg phthalic anhydride was dissolved in 0.5 g of tetrahydrofuran and added dropwise into the polymer solution, followed by stirring for 4 hours at 50° C. Separately, 0.6 g of zinc oxide nanoparticles, 100 nm, were dissolved in 2 mL of ethanol by sonication for 60 minutes. The zinc oxide nanoparticle dispersion was added dropwise to the polymer solution under continuous, vigorous stirring for 60 minutes. The resulting solution (the reversibly crosslinkable composition) was deposited on an aluminum substrate and dried at 70° C. to form a crosslinked film (the removable crosslinked film), which had a homogeneous white appearance.

Example 2. Silicone Polymer Functionalized with Phthalic Anhydride and Silicon Dioxide Nanoparticles The procedure of Example 1 was repeated but using silicon dioxide nanoparticles, Ludox TMA (1.8 g of solution, 0.6 g of particles). In this case, the crosslinked film was transparent.

Example 3. Silicone Polymer Functionalized with Succinic Anhydride and Zinc Oxide Nanoparticles To prepare functionalized silicone polymer without an aromatic moiety, 2 g of (6-7% aminopropylmethylsiloxane)-dimethylsiloxane copolymer, $M_w$~50,000 Da was dissolved in 3 g of tetrahydrofuran at 50° C. at a stirring rate of 1000 RPM. Next, 33 mg of succinic anhydride was dissolved in 0.5 g of tetrahydrofuran and added dropwise into the polymer solution, followed by stirring for 4 hours at 50° C. Separately, 0.6 g of zinc oxide nanoparticles, 100 nm, were dissolved in 2 mL of ethanol by sonication for 60 minutes. The zinc oxide nanoparticle dispersion was added dropwise to the polymer solution under continuous, vigorous stirring for 60 minutes. The resulting solution (the reversibly crosslinkable composition) was deposited on an aluminum substrate (the removable crosslinked film) and dried at 70° C. to form a crosslinked film, which had a homogeneous white appearance.

Example 4. Silicone Polymer Functionalized with Succinic Anhydride and Silicon Dioxide Nanoparticles The procedure of Example 3 was repeated but using silicon dioxide nanoparticles, Ludox TMA (1.8 g of solution, 0.6 g of particles). In this case, the crosslinked film was transparent.

The resulting crosslinked films were evaluated for tack and rub resistance. Tack was evaluated on a relative scale from 0 (no tack) to 5 (high tack). The rub resistance was evaluated by a double rub using a metal spatula across the surface of the crosslinked film wetted with a solvent (water or tetrahydrofuran). The number of double rubs corresponds to the point when crosslinked film detached from the substrate, e.g., a rub resistance of 5 indicates that 5 double rubs were required to remove the crosslinked film from the substrate. The results are shown in Table 2.

TABLE 2

Tack and Rub Resistance of Crosslinked Films.

| Cyclic anhydride | Inorganic Oxide Nanoparticle (% wt.) | Tack (23° C.) | Tack (50° C.) | Rub resistance with water (23° C.) | Rub resistance with water (50° C.) | Rub resistance with tetrahydrofuran (23° C.) |
|---|---|---|---|---|---|---|
| Phthalic anhydride | Zinc oxide (30%) | 1 | 5 | 20 | 5 | 10 |
| Phthalic anhydride | Zinc oxide (40%) | 1 | 5 | 50 | 5 | 20 |
| Phthalic anhydride | Silicon dioxide (30%) | 0 | 0 | 10 | 5 | 10 |
| Phthalic anhydride | Silicon dioxide (40%) | 0 | 0 | 10 | 5 | 20 |
| Succinic anhydride | Zinc oxide (30%) | 0 | 5 | 20 | 10 | 10 |
| Succinic anhydride | Zinc oxide (40%) | 0 | 5 | 50 | 10 | 20 |
| Succinic anhydride | Silicon dioxide (30%) | 0 | 1 | 30 | 5 | 10 |
| Succinic anhydride | Silicon dioxide (40%) | 0 | 1 | 30 | 5 | 20 |

The crosslinked films were non-tacky and resistant to removal using water at room temperature. On the other hand, at 50° C., the crosslinked films became tacky and could be easily removed with water.

It will be appreciated that variants of the above-disclosed and other features and functions or alternatives thereof, may be combined into many other different systems or applications. Various presently unforeseen or unanticipated alternatives, modifications, variations or improvements therein may be subsequently made by those skilled in the art, which are also intended to be encompassed by the following claims.

What is claimed is:

1. A reversibly crosslinkable composition for forming a removable crosslinked film, the composition comprising entangled chains of a polysiloxane comprising pendant functional groups having formula —NH—(C═O)—X—COOH, wherein X is an alkyl group, an alkenyl group, or an aryl group, wherein the polysiloxane is free of an amine group other than that of the pendant functional groups, and wherein the entangled chains are free of covalent crosslinks between entangled chains or portions thereof;
a plurality of inorganic oxide nanoparticles; and
a solvent;
wherein the composition is capable of forming a removable crosslinked film on a surface of a substrate upon removal of the solvent from the composition, wherein non-covalent bonds between the pendant functional groups and the inorganic oxide nanoparticles crosslink the entangled chains to form a polymeric matrix of the removeable crosslinked film in the absence of the solvent, wherein the non-covalent bonds dissociate and the polymeric matrix collapses in the presence of water and heat at a temperature of no more than 70° C., thereby releasing the removable crosslinked film from the surface of the substrate.

2. The reversibly crosslinkable composition of claim 1, wherein the pendant functional groups are selected from a group consisting of —NH—(C=O)—(CH=CH)—COOH; —NH—(C=O)—(CH$_2$CH$_2$)—COOH; —NH—(C=O)—(CH$_2$C=CH$_2$)—COOH; —NH—(C=O)—(C$_6$H$_4$)—COOH; —NH—(C=O)—(CH$_2$CH$_2$CH$_2$)—COOH; —NH—(C=O)—(CH$_2$CHCH$_2$CH=CH(CH$_2$)$_8$CH$_3$)—COOH; and combinations thereof.

3. The reversibly crosslinkable composition of claim 1, wherein the pendant functional groups are present in the polysiloxane at a mole percentage of from 2% to 30%.

4. The reversibly crosslinkable composition of claim 1, wherein the polysiloxane is derived from the reaction of an amino-functionalized polysiloxane with a cyclic anhydride.

5. The reversibly crosslinkable composition of claim 4, wherein the amino-functionalized polysiloxane is a copolymer comprising [OSiR$_2$] monomeric units wherein R is an unsubstituted alkyl or an unsubstituted phenyl and [OSiR'$_2$] monomeric units wherein R' is the alkyl or the phenyl, substituted with a primary amine (—NH$_2$) group.

6. The reversibly crosslinkable composition of claim 4, wherein the amino-functionalized polysiloxane is selected from 20% aminoethylaminopropyl-methylsiloxanedimethylsiloxane copolymer; 6-7% aminopropylmethylsiloxane-dimethylsiloxane copolymer; 4-5% aminopropylmethylsiloxane-(dimethylsiloxane) copolymer; 18-24% aminoethylaminopropylmethylsiloxane-dimethylsiloxane copolymer; and combinations thereof wherein each percentage refers to an amount of primary amine-containing monomeric unit in the amino-functionalized polysiloxane as a mole %.

7. The reversibly crosslinkable composition of claim 1, wherein the inorganic oxide nanoparticles are zinc oxide nanoparticles, silicon dioxide nanoparticles, titanium dioxide nanoparticles, aluminum oxide nanoparticles, or combinations thereof.

8. The reversibly crosslinkable composition of claim 7, wherein the inorganic oxide nanoparticles have an average diameter in a range of from 10 nm to 500 nm.

9. The reversibly crosslinkable composition of claim 1, wherein the inorganic oxide nanoparticles are present at an amount in a range of from 10 wt % to 50 wt %.

10. The reversibly crosslinkable composition of claim 1, wherein the pendant functional groups are present in the polysiloxane at a mole percentage of from 2% to 10% and are selected from a group consisting of —NH—(C=O)—(CH=CH)—COOH; —NH—(C=O)—(CH$_2$CH$_2$)—COOH; —NH—(C=O)—(CH$_2$C=CH$_2$)—COOH; —NH—(C=O)—(C$_6$H$_4$)—COOH; —NH—(C=O)—(CH$_2$CH$_2$CH$_2$)—COOH; —NH—(C=O)—(CH$_2$CHCH$_2$CH=CH(CH$_2$)$_8$CH$_3$)—COOH; and combinations thereof; and wherein the inorganic oxide nanoparticles have an average diameter in a range of from 20 nm to 100 nm and are present at an amount in a range of from 15 wt % to 30 wt %.

11. The reversibly crosslinkable composition of claim 1, wherein the polysiloxane comprising the pendant functional groups is the only polymeric component in the composition.

12. The reversibly crosslinkable composition of claim 1, consisting of the polysiloxane comprising the pendant functional groups, the plurality of inorganic oxide nanoparticles, the solvent, and optionally, one or more additives selected from surfactants, wetting agents, adhesion promoters, pH adjusters, and stabilizers.

13. The reversibly crosslinkable composition of claim 1, wherein the composition is free of a chemical curing agent.

14. The reversibly crosslinkable composition of claim 1, wherein the composition is free of an organosilane compound.

15. The reversibly crosslinkable composition of claim 1, wherein the removeable crosslinked film formed from the composition has a rub resistance of greater than 10 in the presence of water and at room temperature and a rub resistance of less than 10 in the presence of water and at 50° C.

16. The reversibly crosslinkable composition of claim 15, wherein the removeable crosslinked film formed from the composition has an average thickness in a range of from 1 µm to 10 µm.

17. The reversibly crosslinkable composition of claim 11, wherein the pendant functional groups are present in the polysiloxane at a mole percentage of from 2% to 10% and are selected from a group consisting of —NH—(C=O)—(CH=CH)—COOH; —NH—(C=O)—(CH$_2$CH$_2$)—COOH; —NH—(C=O)—(CH$_2$C=CH$_2$)—COOH; —NH—(C=O)—(C$_6$H$_4$)—COOH; —NH—(C=O)—(CH$_2$CH$_2$CH$_2$)—COOH; —NH—(C=O)—(CH$_2$CHCH$_2$CH=CH(CH$_2$)$_8$CH$_3$)—COOH; and combinations thereof; and wherein the inorganic oxide nanoparticles have an average diameter in a range of from 20 nm to 100 nm and are present at an amount in a range of from 15 wt % to 30 wt %.

18. The reversibly crosslinkable composition of claim 17, wherein the polysiloxane is derived from the reaction of an amino-functionalized polysiloxane with a cyclic anhydride and the amino-functionalized polysiloxane is 6-7% aminopropylmethylsiloxane-dimethylsiloxane copolymer, 4-5% aminopropylmethylsiloxane-(dimethylsiloxane) copolymer, or a combination thereof, wherein each percentage refers to an amount of primary amine-containing monomeric unit in the amino-functionalized polysiloxane as a mole %.

* * * * *